US00RE46224E

(19) United States
(12) Reissued Patent
Chou

(10) Patent Number: US RE46,224 E
(45) Date of Reissued Patent: Nov. 29, 2016

(54) HIGH-SPEED CMOS IMAGE SENSOR

(75) Inventor: Kuo-Yu Chou, Hsinchu (TW)

(73) Assignee: NOVATEK Microelectronics Corp., Hsin-Chu (TW)

(21) Appl. No.: 13/485,940

(22) Filed: Jun. 1, 2012

Related U.S. Patent Documents

Reissue of:
(64) Patent No.: 7,728,894
Issued: Jun. 1, 2010
Appl. No.: 11/682,280
Filed: Mar. 5, 2007

(30) Foreign Application Priority Data

Oct. 2, 2006 (TW) ..... 95136568 A

(51) Int. Cl.
*H04N 3/14* (2006.01)
*H04N 5/335* (2006.01)
*H04N 5/374* (2011.01)
*H04N 5/378* (2011.01)
*H04N 9/04* (2006.01)

(52) U.S. Cl.
CPC ..... *H04N 3/155* (2013.01); *H04N 5/378* (2013.01); *H04N 5/3741* (2013.01); *H04N 9/045* (2013.01)

(58) Field of Classification Search
CPC .... H04N 5/335; H04N 3/155; H04N 5/3741; H04N 9/045
USPC ..... 348/302, 294–297, 299–301, 307–310
See application file for complete search history.

(56) References Cited

U.S. PATENT DOCUMENTS 5,838,469 A * 11/1998 Campbell et al. ..... 359/21
5,965,871 A * 10/1999 Zhou et al. ..... 250/208.1
6,466,265 B1 * 10/2002 Lee et al. ..... 348/308
6,590,198 B1 * 7/2003 Zarnowski et al. .... 250/214 LS
6,741,373 B1 * 5/2004 Chizawa ..... 358/475
6,822,211 B2 * 11/2004 Hagihara ..... 250/208.1
6,977,682 B2 * 12/2005 Mizuno et al. ..... 348/241
7,256,382 B2 * 8/2007 Yahazu et al. ..... 250/208.1
7,408,443 B2 * 8/2008 Nam ..... 348/283
7,619,669 B2 * 11/2009 Barna et al. ..... 348/283
7,948,544 B2 * 5/2011 Park et al. ..... 348/308
2002/0154347 A1 * 10/2002 Funakoshi et al. ..... 358/513
2003/0043089 A1 * 3/2003 Hanson et al. ..... 345/55
2003/0117386 A1 * 6/2003 Mabuchi ..... 345/204
2004/0257128 A1 12/2004 Roh
2005/0012836 A1 * 1/2005 Guidash ..... 348/302
2005/0237406 A1 * 10/2005 Kim et al. ..... 348/308
2005/0237407 A1 * 10/2005 Bae ..... 348/308
2005/0253947 A1 * 11/2005 Kim et al. ..... 348/308
2006/0044440 A1 * 3/2006 Park et al. ..... 348/308
2007/0132868 A1 * 6/2007 Lee et al. ..... 348/308
2008/0197267 A1 * 8/2008 Mizuno et al. ..... 250/208.1
2010/0271523 A1 * 10/2010 Hara ..... 348/302

FOREIGN PATENT DOCUMENTS

JP 2005312025 11/2005
WO WO 2005108938 A1 * 11/2005

* cited by examiner

*Primary Examiner* — Stephen J Ralis
(74) *Attorney, Agent, or Firm* — Winston Hsu; Scott Margo

(57) ABSTRACT

A CMOS image sensor having two ASPs can reduce increasing design difficulty as arising from a pixel array becoming larger and larger. The image sensor includes a selection circuit for transmitting outputs of CDS circuits through four divided buses to reduce parasitic loading and achieve high-speed operation. Then, the selecting circuit transmits red and blue pixels to a first ASP, and transmits green pixels to a second ASP, so as to relax the specification requirements of the ASP.

34 Claims, 7 Drawing Sheets

HIGH-SPEED CMOS IMAGE SENSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a CMOS image sensor, and more particularly, to a CMOS image sensor having two analog signal processors (ASP) for high-speed operation.

2. Description of the Prior Art

Image sensors, which can convert optical images to electrical signals, are classified into complementary metal oxide semiconductor (CMOS) image sensors and charge-coupled device (CCD) image sensors. For CCD image sensors, electric charges are transmitted to and stored in capacitors arranged close together. For CMOS image sensors, pixel arrays are formed in a CMOS integrated circuit process, and electric charges are detected sequentially by switch operations. The CMOS image sensor has a benefit of low power consumption, and is generally used in mobile communications devices.

Please refer to FIG. 1. FIG. 1 is a diagram of a CMOS image sensor according to the prior art. The CMOS image sensor includes a pixel array 11 having red pixels (R), green pixels (G), and blue pixels (B) arranged in a matrix. A plurality of correlation double sampling (CDS) circuits 12 is arranged under the pixel array 11, and each CDS circuit is coupled to a corresponding column of the pixel array 11. An analog signal processor (ASP) 13 is arranged on a side of the pixel array 11 for processing output signals of the plurality of CDS circuits 12.

The CDS circuit 12 samples the reset signal and the data signal from each pixel, and transmits the signals to the ASP 13. Then, the ASP 13 calculates the difference of the reset signal and the data signal, and amplifies the signal to obtain image data of the object. In the process of reading the image data, one row of the pixel array 11 transmits the image data to the corresponding CDS circuits 12. Finally, the output data of the CDS circuit 12 controlled by the driver 14 is transmitted sequentially to the ASP 13.

As mentioned above, in the CMOS image sensor according to the prior art, when the one row of the pixel array is selected, the reset signals and the data signals of the pixels of the row are stored in the corresponding CDS circuits, and then the data of the corresponding CDS circuits controlled by the driver is transmitted sequentially to the ASP.

When the pixel array has over a million pixels, the number of CDS circuits increases with the number of pixels in each row. Since the bus for transmitting the data to the ASP is coupled to a large number of CDS circuits, the parasitic impedances of the bus are increased. Thus, the CMOS image sensor cannot operate at a high speed. For high-speed operation, the CMOS image sensor has to be improved, especially the ASP of the CMOS image sensor.

SUMMARY OF THE INVENTION

The present invention provides a complementary metal oxide semiconductor (CMOS) image sensor for high-speed operation comprising a pixel array comprising a plurality of first pixels, a plurality of second pixels, and a plurality of third pixels; a plurality of correlation double sampling (CDS) circuits coupled to corresponding columns of the pixel array; a selection circuit comprising a plurality of input ends coupled to each CDS circuit of the plurality of CDS circuits respectively, a first output end, and a second output end; a first analog signal processor (ASP) coupled to the first output end of the selection circuit for processing data of the plurality of first pixels and the plurality of second pixels; and a second analog signal processor (ASP) coupled to the second output end of the selection circuit for processing data of the plurality of third pixels.

The present invention provides a complementary metal oxide semiconductor (CMOS) image sensor for high-speed operation comprising a pixel array comprising a plurality of first pixels, a plurality of second pixels, and a plurality of third pixels; a switch circuit comprising a plurality of input ends coupled to corresponding columns of the pixel array, and a plurality of output ends; a plurality of correlation double sampling (CDS) circuits coupled to the plurality of output ends of the switch circuit respectively; an output circuit comprising a plurality of input ends coupled to each CDS circuit respectively, a first output end, and a second output end; a first analog signal processor (ASP) coupled to the first output end of the output circuit for processing data of the first pixels and the second pixels; and a second analog signal processor (ASP) coupled to the second output end of the output circuit for processing data of the third pixels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
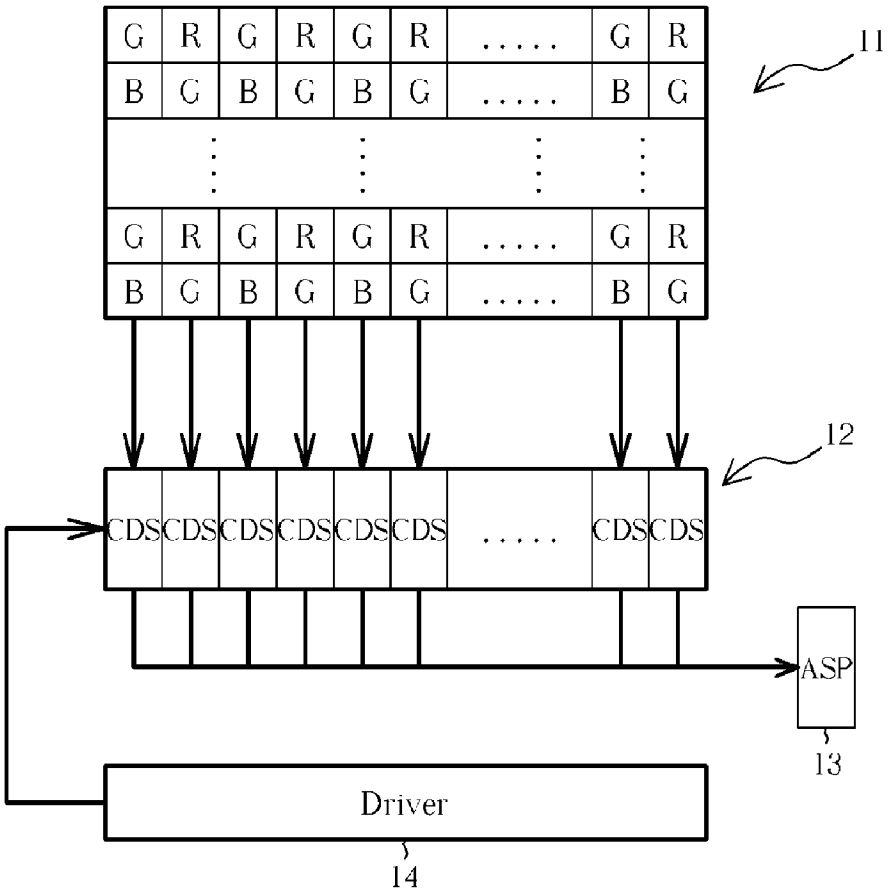
Fig. 1 Prior Art
FIG. 1 is a diagram of a CMOS image sensor according to the prior art.
Figure 2:
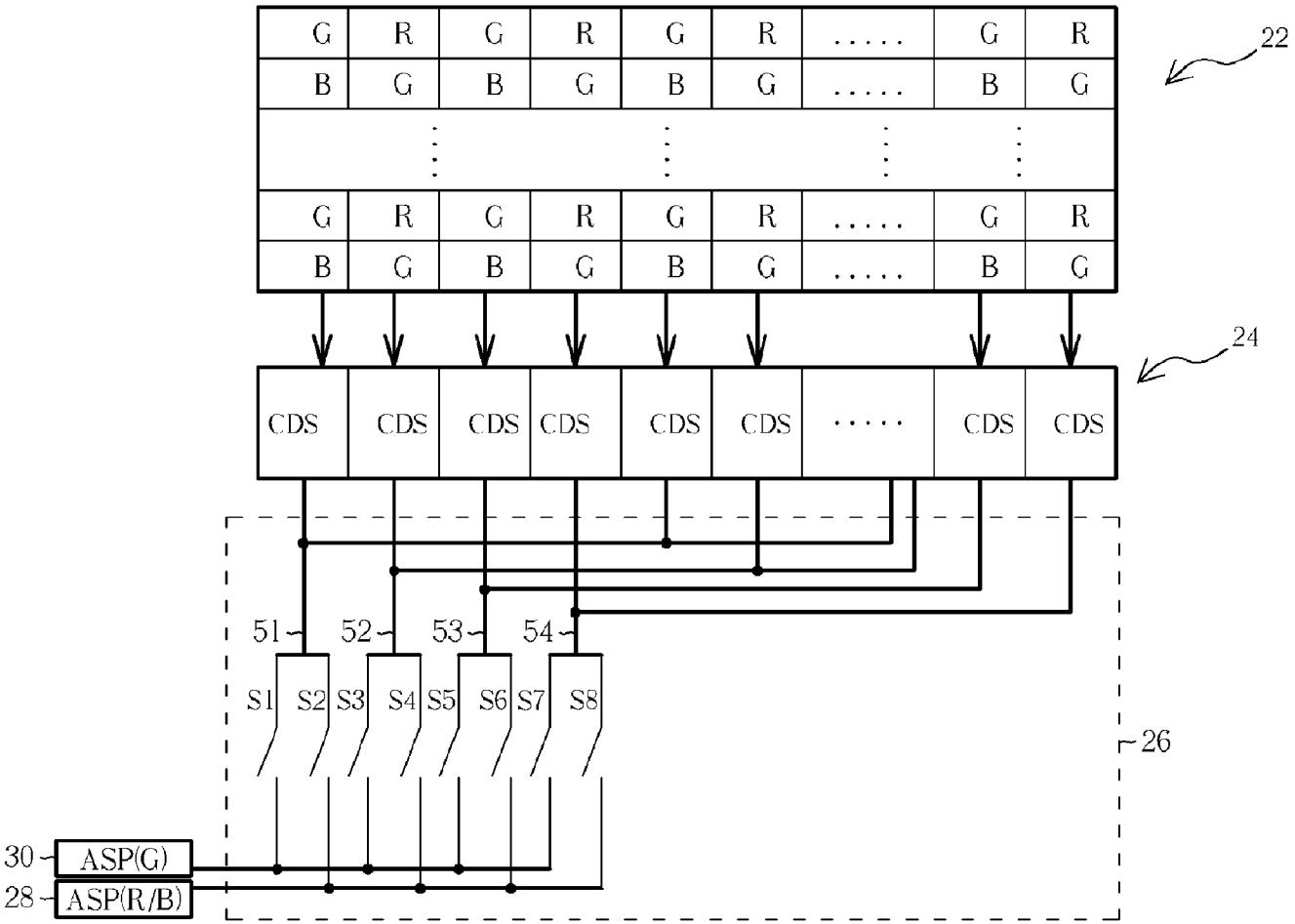
FIG. 2 is a diagram of a first embodiment of a CMOS image sensor according to the present invention.

Please refer to FIG. 2. FIG. 2 is a diagram of a first embodiment of a complementary metal oxide semiconductor (CMOS) image sensor according to the present invention. The CMOS image sensor includes a pixel array 22, a plurality of correlation double sampling (CDS) circuits 24, a selection circuit 26, a first analog signal processor (ASP) 28, and a second ASP 30. The pixel array 22 includes a plurality of first pixels R, a plurality of second pixels B, and a plurality of third pixels G. The plurality of third pixels G and the plurality of first pixels R are arranged alternately in odd rows of the pixel array 22, and the plurality of second pixels B and the plurality of third pixels G are arranged alternately in even rows of the pixel array 22. The plurality of CDS circuits 24 is coupled to corresponding columns of the pixel array 22 on the same side. The plurality of CDS circuits 24 can read data of one row of the pixel array 22 once. The CDS circuits basically include two groups of source followers. However, when outputting data, the CDS circuits have to drive all parasitic impedances of the internal switches because all of the output ends of the CDS circuit are in parallel. As the size of the pixel array 22 increases, for high-speed operation, large switches are used, but the parasitic impedance of the large switches will also limit the speed of the operation. Thus, a divided bus is utilized for reducing the parasitic impedance. In addition, the first pixels R, the second pixels B, and the third pixels G are arranged alternately in the pixel array 22. To simplify signal processing, the first ASP 28 processes signals of the first pixels R and the second pixels B, and the second ASP 30 processes signals of the third pixels G.

Figure 3:
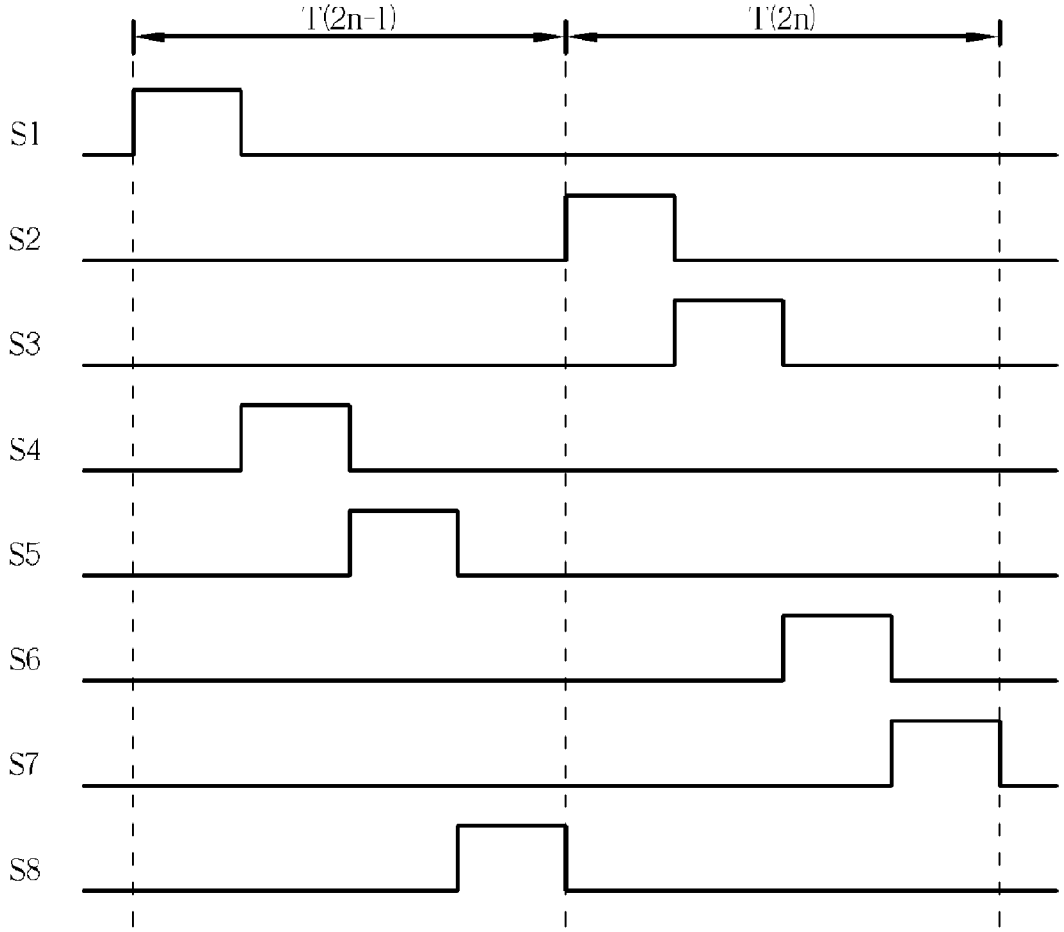
FIG. 3 is a timing diagram of a selection circuit in FIG. 2.

Please refer to FIG. 3. FIG. 3 is a timing diagram of the selection circuit 26 in FIG. 2. T(2n−1) and T(2n) represent the operation of the odd rows and the even rows of the pixel array 22, respectively. The selection circuit 26 divides the plurality of CDS circuits 24 into several groups to implement the divided bus. The selection circuit 26 includes a plurality of input ends coupled to each CDS circuit 24, respectively, and transmits the data of the plurality of CDS circuits 24 to the first ASP 28 or the second ASP 30. The first ASP 28 processes the data of the first pixels R and the second pixels B, and the second ASP 30 processes the data of the third pixels G. The first output end and the second output end of the selection circuit 26 are coupled to the first ASP 28 and the second ASP 30, respectively. The selection circuit 26 includes eight switches S1-S8 to divide the plurality of CDS circuits 24 into four divided buses. The switches S1 and S2 are regarded as a first divided bus 51, and are coupled to the 4n−3th CDS circuits. The switches S3 and S4 are regarded as a second divided bus 52 coupled to the 4n−2th CDS circuits. The switches S5 and S6 are regarded as a third divided bus 53 coupled to the 4n−1th CDS circuits. The switches S7 and S8 are regarded as the fourth divided bus 54 coupled to the 4nth CDS circuits. The factor n is a positive integer. If each internal switch of the CDS circuits is the same, the parasitic loading will be reduced to ¼, so as to speed up the operation.

The timing diagram of the switches S1-S8 is shown in FIG. 3. When the plurality of CDS circuits 24 reads the data of the odd rows of the pixel array 22, only the switches S1, S4, S5, and S8 are turned on, so that the data of the first divided bus 51 and third divided bus 53 can be transmitted to the first ASP 28, and the data of the second divided bus 52 and the fourth divided bus 54 can be transmitted to the second ASP 30. When the plurality of CDS circuits 24 reads the data of the even rows of the pixel array 22, only the switches S2, S3, S6, and S7 are turned on, so that the data of the second divided bus 52 and fourth divided bus 54 can be transmitted to the first ASP 28, and the data of the first divided bus 51 and third divided bus 53 can be transmitted to the second ASP 30. As mentioned above, the third divided bus 53 and the first divided bus 51 can be combined into one path, and the fourth divided bus 54 and the second divided bus 52 can be combined into one path. However, the parasitic loading is reduced to ½ in the situation of two groups of divided busses, so the improvement is not as good. In the architecture of the CDS circuits 24, the control signals of the divided busses 51-53 may overlap, but the divided busses can still operate normally, because each divided bus is independent of the other three divided busses. In addition, the switches S1, S3, S5, and S7 can be turned off so as to use only the first ASP 28 for saving power consumption.

Figure 4:
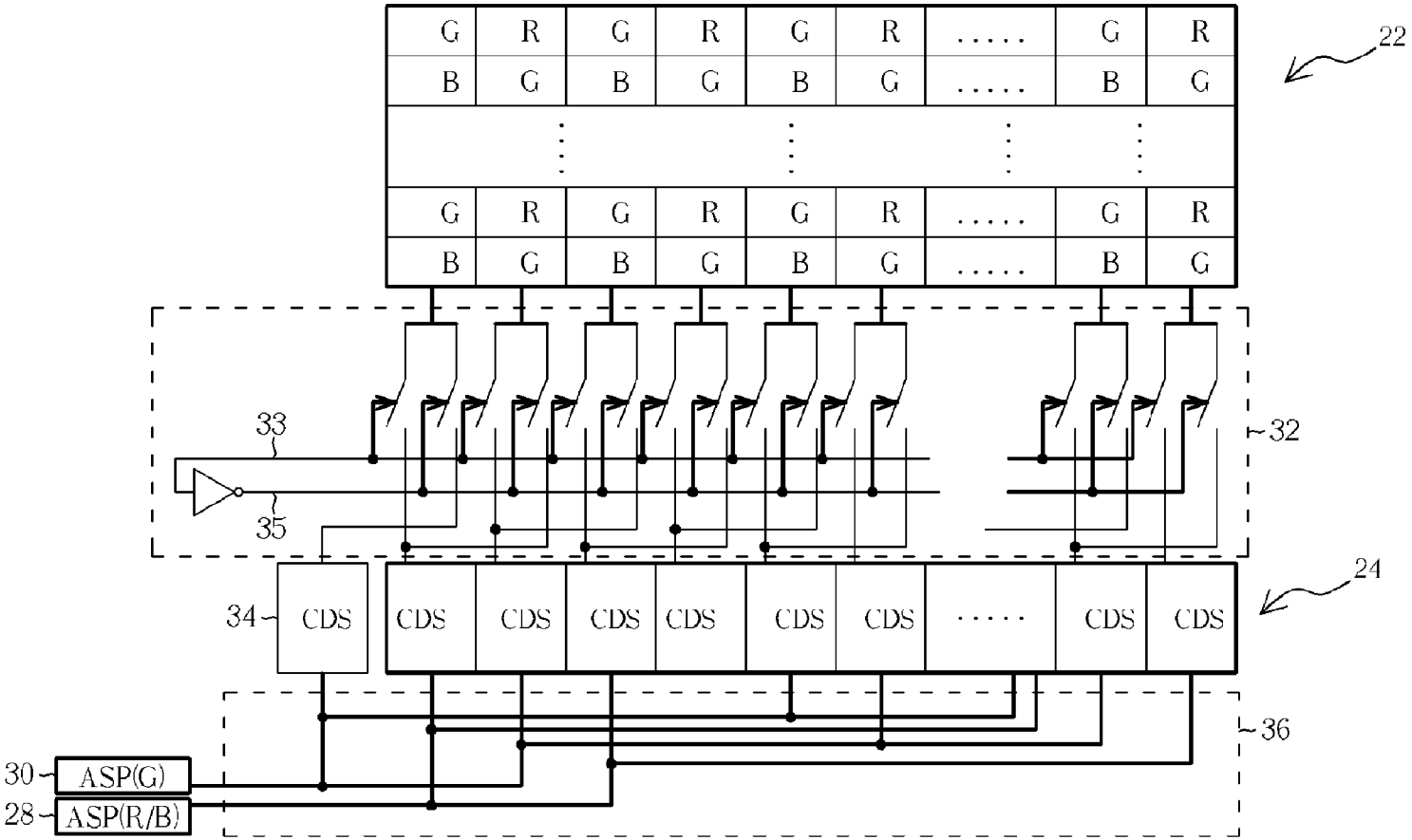
FIG. 4 is a diagram of a second embodiment of a CMOS image sensor according to the present invention.

Please refer to FIG. 4. FIG. 4 is a diagram of a second embodiment of a CMOS image sensor according to the present invention. In the second embodiment, the CMOS image sensor further includes a switch circuit 32 and an auxiliary CDS circuit 34. In addition, the selection circuit 26 is replaced by an output circuit 36. The switch circuit 32 is coupled between the pixel array 22 and the plurality of CDS circuits 24. The auxiliary CDS circuit 34 is coupled between the switch circuit 32 and the output circuit 36. The switch circuit 32 includes a first group of switches 33 and a second group of switches 35. The first group of switches 33 couples the nth column of the pixel array 22 to the nth CDS circuit 24, respectively. The second group of switches 35 couples the first column of the pixel array 22 to the auxiliary CDS circuit 34, and couples the nth column of the pixel array 22 to the n−1th CDS circuit 24. The factor n is a positive integer. The first group of switches 33 and the second group of switches 35 operate complementarily; that is, when one group of switches turns on, another group of switches turns off. The switch circuit 32 utilizes a shift method to transmit the data of the first pixels R, the second pixels B, and the third pixels G to the different CDS circuits 24. For example, the pixel R in the second column of the odd row of the pixel array 22 is transmitted to the first CDS circuit 24; the pixel B in the first column of the even row of the pixel array 22 is transmitted to the first CDS circuit 24; the pixel G in the third column of the odd row of the pixel array 22 is transmitted to the second CDS circuit 24; the pixel G in the second column of the even row of the pixel array 22 is transmitted to the second CDS circuit 24; and the auxiliary CDS circuit 34 receives the pixel G in the first column of the odd row of the pixel array 22. Thus, the output circuit 36 can output the data of the pixel array 22 to the first ASP 28 or the second ASP 30 directly without switches.

Figure 5:
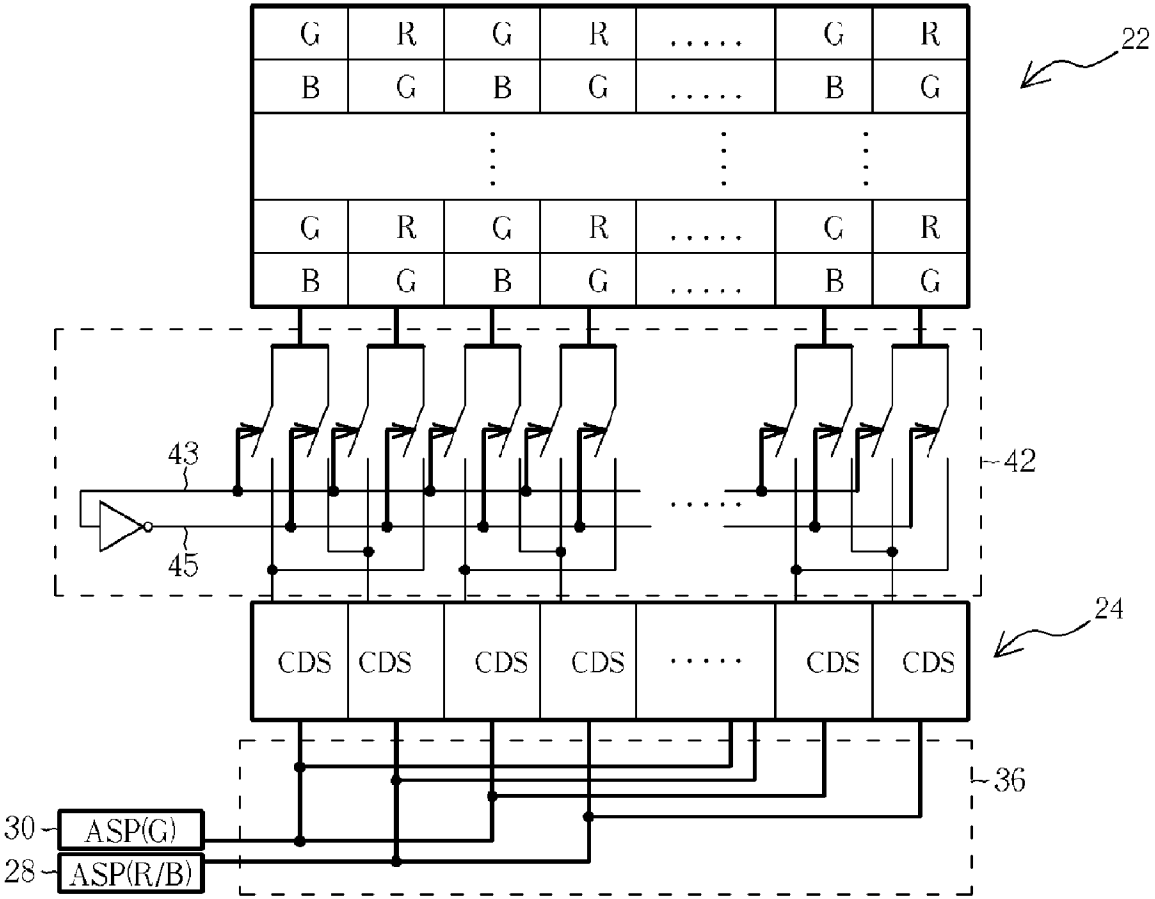
FIG. 5 is a diagram of a third embodiment of a CMOS image sensor according to the present invention.

Please refer to FIG. 5. FIG. 5 is a diagram of a third embodiment of a CMOS image sensor according to the present invention. The third embodiment does not use the auxiliary CDS circuit 34, so the third embodiment has a different switch circuit 42 from the second embodiment. The switch circuit 42 includes a first group of switches 43 and a second group of switches 45. The first group of switches 43 couples the mth column of the pixel array 22 to the mth CDS circuit 24. The second group of switches 45 couples the 2n−1th column of the pixel array 22 to the 2nth CDS circuit 24, and couples the 2nth column of the pixel array 22 to the 2n−1th CDS circuit. The factors m and n are positive integers. If the pixel array 22 has N columns, the factor m ranges from 1 to N, and the factor n ranges from 1 to N/2. Since the first pixels R, the second pixels B, and the third pixels G are arranged alternately in the pixel array 22, the switch circuits 42 can transmit the data of the first pixels R, the second pixels B, and the third pixels G to the CDS circuits 24 alternately without the auxiliary CDS circuit 34.

Figure 6:
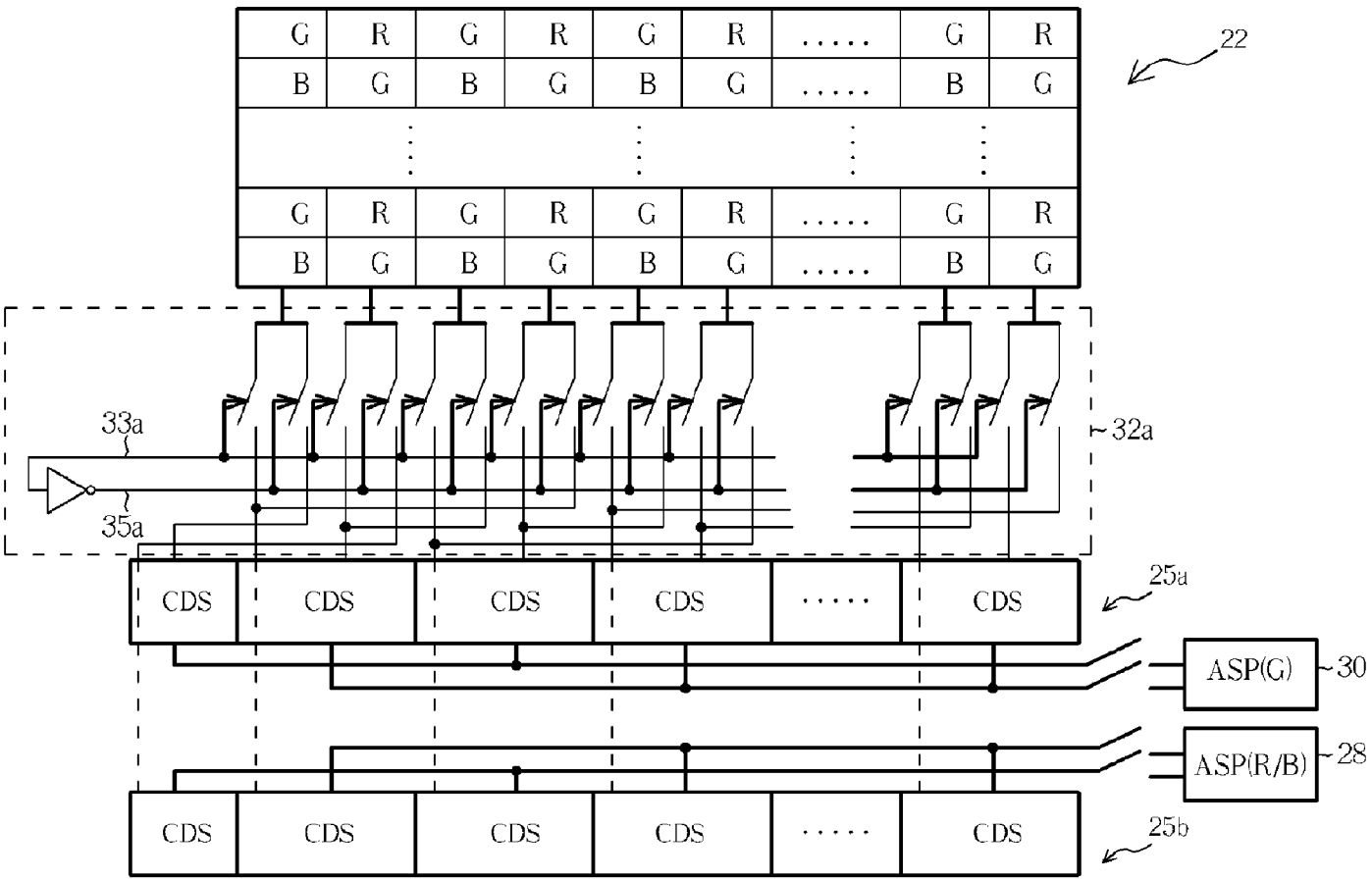
FIG. 6 is a diagram of a fourth embodiment of a CMOS image sensor according to the present invention.

Please refer to FIG. 6. FIG. 6 is a fourth embodiment of a CMOS image sensor according to the present invention. In the fourth embodiment, the CMOS image sensor includes a first group of CDS circuits 25a and a second group of CDS circuits 25b, which are arranged on a same side of the pixel array 22. Utilizing two groups of CDS circuits gives flexibility for arrangement, because the CDS circuits require a large area. The operation of the fourth embodiment is similar to the second embodiment, utilizing the shift method to transmit the data of the pixel array 22 to the CDS circuits. A switch circuit 32a has a first group of switches 33a and a second group of switches 35a. For the odd row of the pixel array, when the second group of switches 35a turns on, the green pixels are transmitted to the second group of CDS circuits 25b and the red pixels are transmitted to the first group of CDS circuits 25a. For the even row of the pixel array, when the first group of switches 33a turns on, the blue pixels are transmitted to the first group of CDS circuits 25a and the green pixels are transmitted to the second group of CDS circuits 25b. Finally, the data of the first group of CDS circuits 25a are transmitted to the second ASP 30 through two divided buses, and the data of the second group of CDS circuits 25a are transmitted to the first ASP 28 through two divided buses.

Figure 7:
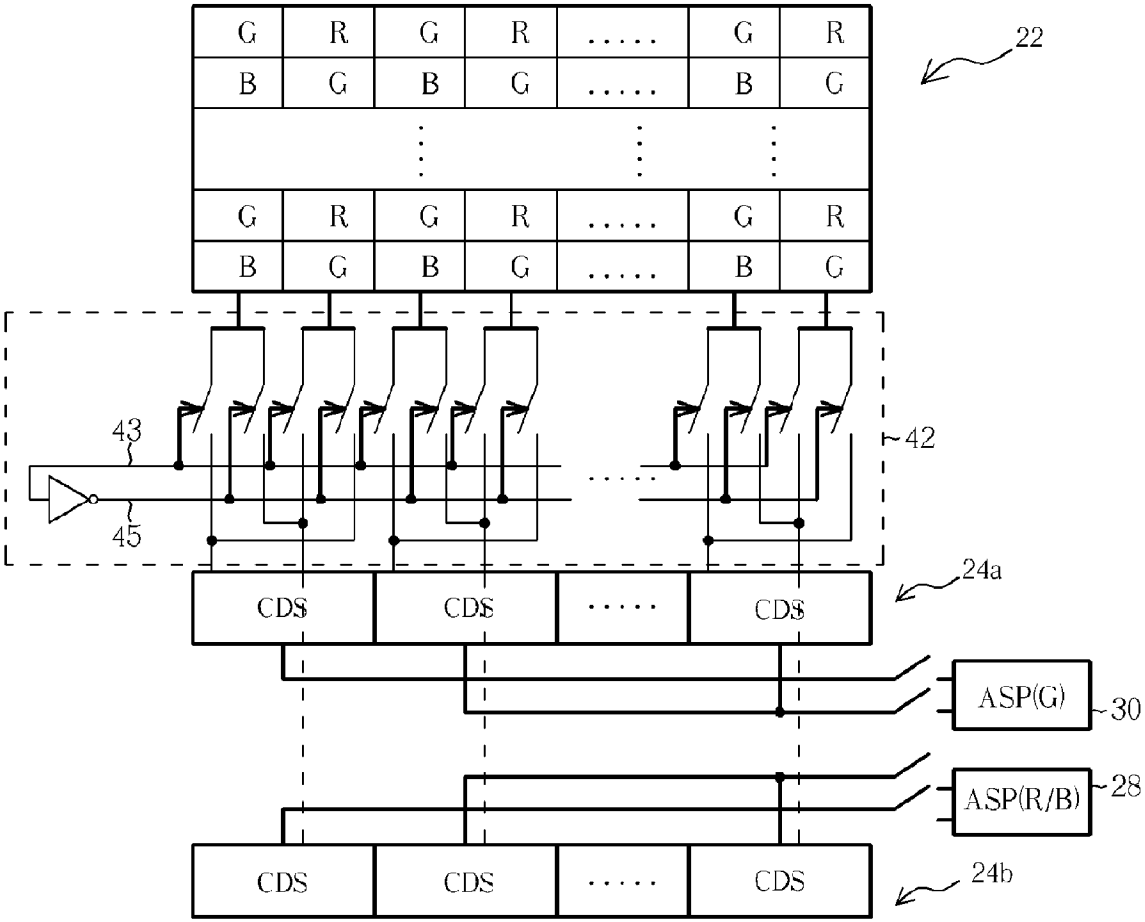
FIG. 7 is a diagram of a fifth embodiment of a CMOS image sensor according to the present invention.

Please refer to FIG. 7. FIG. 7 is a diagram of a fifth embodiment of a CMOS image sensor according to the present invention. In comparison with the third embodiment, the CMOS image sensor includes a first group of CDS circuits 24a and a second group of CDS circuits 24b, which are arranged on a same side of the pixel array 22. In comparison with the fourth embodiment, the number of each group of CDS circuits 24a and 24b is one less than the number of each group of CDS circuits 25a and 25b of the fourth embodiment. For the odd row of the pixel array, when the first group of switches 43 turns on, the green pixels are transmitted to the first group of CDS circuits 24a and the red pixels are transmitted to the second group of CDS circuits 24b. For the even row of the pixel array, when the second group of switches 45 turns on, the blue pixels are transmitted to the second group of CDS circuits 24b and the green pixels are transmitted to the first group of CDS circuits 24a.

In summary, the CMOS image sensor according to the present invention includes two ASPs so as to reduce design difficulty due to the large size of the pixel array. In the first embodiment, the selection circuit transmits the red pixels and the blue pixels to the first ASP, and transmits the green pixels to the second ASP. In addition, the selection circuit utilizes four divided buses to output data of the plurality of CDS circuits, so as to reduce the parasitic loading and achieve high-speed operation. In the second embodiment and the third embodiment, the switch circuit is utilized to output the data of the red, blue, and green pixels of the pixel array to the separate CDS circuits. The switch circuit shifts the data of the pixel array to the CDS circuit with the auxiliary CDS circuit in the second embodiment. The switch circuit transmits the data of the pixel array alternately in the third embodiment. The switch circuit requires more switches than the selection circuit, but the requirements of the switches in the switch circuit are comparatively low, because the transmission speed from the pixel array is lower than transmission from the CDS circuits to the ASPs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

[1. A complementary metal oxide semiconductor (CMOS) image sensor for high-speed operation comprising:

a pixel array comprising a plurality of first pixels, a plurality of second pixels, and a plurality of third pixels;

a plurality of correlation double sampling (CDS) circuits coupled to corresponding columns of the pixel array; and a selection circuit comprising:

a plurality of input ends coupled to each CDS circuit of the plurality of CDS circuits respectively;

a first output end;

a second output end;

a first switch coupling a 4n−3th CDS circuit to a first analog signal processor (ASP);

a second switch coupling the 4n−3th CDS circuit to a second ASP;

a third switch coupling a 4n−2th CDS circuit to the first ASP;

a fourth switch coupling the 4n−2th CDS circuit to the second ASP;

a fifth switch coupling a 4n−1th CDS circuit to the first ASP;

a sixth switch coupling the 4n−1th CDS circuit to the second ASP;

a seventh switch coupling a 4nth CDS circuit to the first ASP; and a eighth switch coupling the 4nth CDS circuit and to the second ASP;

wherein n is a positive integer;

wherein the first ASP is coupled to the first output end of the selection circuit for processing data of the plurality of first pixels and the plurality of second pixels;

wherein the second ASP is coupled to the second output end of the selection circuit for processing data of the plurality of third pixels.]

[2. The CMOS image sensor of claim 1, wherein the plurality of CDS circuits are coupled to a same side of each column of the pixel array respectively.]

[3. The CMOS image sensor of claim 1, wherein the plurality of first pixels, the plurality of second pixels, and the plurality of third pixels are red pixel pixels, blue pixels, and green pixels respectively.]

4. A complementary metal oxide semiconductor (CMOS) image sensor for high-speed operation comprising:

a pixel array comprising a plurality of first pixels, a plurality of second pixels, and a plurality of third pixels;

a plurality of correlation double sampling (CDS) circuits;

an output circuit comprising a plurality of input ends coupled to each CDS circuit respectively, a first output end, and a second output end;

an auxiliary CDS circuit;

a switch circuit comprising:

a first group of switches coupling an nth column of the pixel array to the nth CDS circuit; and a second group of switches coupling the first column of the pixel array to the auxiliary CDS circuit, and coupling an [n+1th)] *(n+1)th* column of the pixel array to the nth CDS circuit;

a first analog signal processor (ASP) coupled to the first output end of the output circuit for processing data of the plurality of first pixels and the plurality of second pixels; and a second analog signal processor (ASP) coupled to the second output end of the output circuit for processing data of the plurality of third pixels;

wherein the auxiliary CDS circuit is coupled between the switch circuit and the output circuit; wherein a [2n−1th] *(2n−1)th* CDS circuit is coupled to the first ASP via the output circuit, the auxiliary CDS circuit and a 2nth CDS circuit are coupled to the second ASP via the output circuit, and n is a positive integer.

5. The CMOS image sensor of claim 4, wherein the plurality of CDS circuits are coupled to a same side of each column of the pixel array respectively.

6. The CMOS image sensor of claim 4, wherein the plurality of first pixels, the plurality of second pixels, and the plurality of third pixels are red pixels, blue pixels, and green pixels respectively.

7. A complementary metal oxide semiconductor (CMOS) image sensor for high-speed operation comprising:

a pixel array comprising a plurality of first pixels, a plurality of second pixels, and a plurality of third pixels;

a plurality of correlation double sampling (CDS) circuits;

an output circuit comprising a plurality of input ends coupled to each CDS circuit respectively, a first output end, and a second output end;

a switch circuit comprising:

a first group of switches coupling a mth column of the pixel array to the mth CDS circuit; and a second group of switches coupling a 2n−1 (2n−1)th column of the pixel array to a 2nth CDS circuit, and coupling the 2nth column of the pixel array to the [2n−1th] *(2n−1)th* CDS circuit;

wherein m and n are positive integers, a first analog signal processor (ASP) coupled to the first output end of the output circuit for processing data of [die] *the* first pixels and the second pixels; and a second analog signal processor (ASP) coupled to the second output end of the output circuit for processing data of the third pixels;

wherein the 2nth CDS is coupled to the first ASP via the output circuit, the [2n−1th] *(2n−1)th* CDS circuit is coupled to the second ASP via the output circuit.

8. A complementary metal oxide semiconductor (CMOS) image sensor for high-speed operation comprising:

a pixel array comprising a plurality of first pixels, a plurality of second pixels, and a plurality of third pixels;

a plurality of correlation double sampling (CDS) circuits, wherein the plurality of CDS circuits comprises a first group of CDS circuits coupled to a first analog signal processor (ASP) which processes data of the first pixels and the second pixels, and a second group of CDS circuits coupled to a second ASP which processes data of the third pixels;

a switch circuit comprising:

a first group of switches coupling a [2n−1th] *(2n−1)th* column of the pixel array to the [n+1th] *(n+1)th* CDS circuit of the first group of CDS [circuit] *circuits* and coupling the 2nth column of the pixel array to the [n+1th] *(n+1)th* CDS circuit of the second group of CDS [circuit] *circuits*; and a second group of switches coupling a 2nth column of the pixel array to the nth CDS circuit of the first group of CDS [circuit] *circuits* and coupling the [2n−1th] *(2n−1)th* column of the pixel array to the nth CDS circuit of the second group of CDS [circuit] *circuits*;

wherein n is a positive integer.

*9. The CMOS image sensor of claim 7, wherein the plurality of CDS circuits are on the same side of the pixel array.*

*10. The CMOS image sensor of claim 9, wherein the plurality of CDS circuits are arranged as a single row.*

*11. The CMOS image sensor of claim 8, wherein the plurality of CDS circuits are on the same side of the pixel array.*

*12. The CMOS image sensor of claim 11, wherein the first group of CDS circuits are arranged as a first row, and the second group of CDS circuits are arranged as a second row.*

*13. The CMOS image sensor of claim 12, further including at least one divided data bus coupled between the plurality of CDS circuits and the first and second ASPs.*

*14. A complementary metal oxide semiconductor (CMOS) image sensor for high-speed operation comprising:*

*a pixel array comprising a plurality of first pixels, a plurality of second pixels, and a plurality of third pixels;*

*a plurality of correlation double sampling (CDS) circuits, wherein the plurality of CDS circuits comprises a first group of CDS circuits coupled to a first analog signal processor (ASP) which processes data of the first pixels and the second pixels, and a second group of CDS circuits coupled to a second ASP which processes data of the third pixels;*

*a switch circuit comprising:*

*a first group of switches coupling (n+1)th column of the pixel array to the nth CDS circuit of the first group of CDS circuits and coupling the nth column of the pixel array to the nth CDS circuit of the second group of CDS circuits; and*

*a second group of switches coupling a nth column of the pixel array to the nth CDS circuit of the first group of CDS circuits and coupling the (n+1)th column of the pixel array to the nth CDS circuit of the second group of CDS circuits;*

*wherein n is a positive integer and the plurality of CDS circuits are on the same side of the pixel array.*

*15. The CMOS image sensor of claim 14, wherein the first group of CDS circuits are arranged as a first row, and the second group of CDS circuits are arranged as a second row.*

*16. The CMOS image sensor of claim 15, further including at least one divided data bus coupled between the plurality of CDS circuits and the first and second ASPs.*

*17. A complementary metal oxide semiconductor (CMOS) image sensor for high-speed operation comprising:*

*a pixel array comprising a plurality of first pixels, a plurality of second pixels, and a plurality of third pixels;*

*a plurality of correlation double sampling (CDS) circuits;*

*a switch circuit arranged on a side of the pixel array, comprising:*

*a first group of switches coupling a mth column of the pixel array to the mth CDS circuit; and*

*a second group of switches coupling a (2n−1)th column of the pixel array to a 2nth CDS circuit, and coupling the 2nth column of the pixel array to the (2n−1)th CDS circuit;*

*wherein m and n are positive integers,*

*wherein the 2nth CDS is coupled to a first ASP which processes data of the first pixels and the second pixels, the (2n−1)th CDS circuit is coupled to a second ASP which processes data of the third pixels.*

*18. The CMOS image sensor of claim 17, wherein the plurality of CDS circuits are on the side of the pixel array.*

*19. The CMOS image sensor of claim 18, wherein the plurality of CDS circuits are arranged as a single row.*

*20. A complementary metal oxide semiconductor (CMOS) image sensor for high-speed operation comprising:*

*a pixel array comprising a plurality of first pixels, a plurality of second pixels, and a plurality of third pixels;*

*a plurality of correlation double sampling (CDS) circuits, wherein the plurality of CDS circuits comprises a first group of CDS circuits coupled to a first analog signal processor (ASP) which processes data of the first pixels and the second pixels, and a second group of CDS circuits coupled to a second ASP which processes data of the third pixels;*

*a switch circuit, coupled between the pixel array and the plurality of CDS circuits comprising:*

*a first group of switches coupling a first set of columns of the pixel array to a first set of CDS circuits of the first group of CDS circuits and coupling a second set of columns of the pixel array to a first set of CDS circuits of the second group of CDS circuits; and*

*a second group of switches coupling a third set of columns of the pixel array to a second set of CDS circuits of the first group of CDS circuits and coupling a fourth set of columns of the pixel array to a second set of CDS circuits of the second group of CDS circuits;*

*wherein the switch circuit and the plurality of CDS circuits are on a same single side of the pixel array.*

*21. The CMOS image sensor of claim 20, wherein the first and second sets of columns of the pixel array are the fourth and third sets of columns of the pixel array, respectively.*

*22. The CMOS image sensor of claim 20, wherein the plurality of CDS circuits are arranged as a single row.*

*23. The CMOS image sensor of claim 20, wherein the first group of CDS circuits are arranged as a first row, and the second group of CDS circuits are arranged as a second row.*

*24. The CMOS image sensor of claim 20, further including at least one divided data bus coupled between the plurality of CDS circuits and the first and second ASPs.*

*25. A complementary metal oxide semiconductor (CMOS) image sensor for high-speed operation comprising:*

*a pixel array comprising a plurality of first pixels, a plurality of second pixels, and a plurality of third pixels;*

*a plurality of correlation double sampling (CDS) circuits;*

*a switch circuit arranged on a single side of the pixel array, comprising:*

*a first group of switches coupling a first set of columns of the pixel array to a first group of CDS circuits of the plurality of CDS circuits; and*

*a second group of switches coupling a second set of columns of the pixel array to a second group of CDS circuits of the plurality of CDS circuits, and coupling a third set of columns of the pixel array to a third group of CDS circuits of the plurality of CDS circuits;*

*wherein the first group of CDS circuits are coupled to a first ASP which processes data of the first pixels and the second pixels, and the second group of CDS circuits are coupled to a second ASP which processes data of the third pixels, and*

*wherein the switch circuit and the plurality of CDS circuits are on a same single side of the pixel array.*

*26. The CMOS image sensor of claim 25, wherein the first set of columns of the pixel array include the second and third sets of columns of the pixel array, and the first group of CDS circuits of the plurality of CDS circuits include the second and third groups of CDS circuits of the plurality of CDS circuits.*

*27. The CMOS image sensor of claim 25, wherein the plurality of CDS circuits are arranged as a single row.*

*28. The CMOS image sensor of claim 25, wherein the first group of CDS circuits are arranged as a first row, and the second group of CDS circuits are arranged as a second row.*

*29. The CMOS image sensor of claim 25, further including at least one divided data bus coupled between the plurality of CDS circuits and the first and second ASPs.*

*30. A complementary metal oxide semiconductor (CMOS) image sensor for high-speed operation comprising:*

*a pixel array comprising a plurality of first pixels, a plurality of second pixels, and a plurality of third pixels;*

*a plurality of correlation double sampling (CDS) circuits coupled to corresponding columns of the pixel array; and*

*a selection circuit comprising:*

*a plurality of input ends coupled to each CDS circuit of the plurality of CDS circuits respectively;*

*a first output end;*

*a second output end;*

*a plurality of switches, comprising a first group of switches coupling a first group of CDS circuits of the plurality of CDS circuits to a first analog signal processor (ASP), and a second group of switches coupling a second group CDS circuits of the plurality of CDS circuits to a second ASP;*

*wherein the first ASP is coupled to the first output end of the selection circuit for processing data of the plurality of first pixels and the plurality of second pixels; wherein the second ASP is coupled to the second output end of the selection circuit for processing data of the plurality of third pixels, and*

*wherein the plurality of switches and the plurality of CDS circuits are on a same single side of the pixel array.*

*31. The CMOS image sensor of claim 30, wherein the plurality of CDS circuits are arranged as a single row.*

*32. The CMOS image sensor of claim 30, wherein the selection circuit further includes at least one divided data bus coupled between the plurality of CDS circuits and the plurality of switches.*

*33. The CMOS image sensor of claim 4, wherein the output circuit includes at least one divided data bus.*

*34. A complementary metal oxide semiconductor (CMOS) image sensor for high-speed operation comprising:*

*a pixel array comprising a plurality of pixels;*

*a plurality of correlation double sampling (CDS) circuits coupled to corresponding columns of the pixel array; and*

*a selection circuit comprising:*

*a plurality of input ends coupled to each CDS circuit of the plurality of CDS circuits respectively;*

*a first output end coupled to a first analog signal processor (ASP);*

*a second output end coupled to a second analog signal processor (ASP); and*

*a plurality of switches, comprising a plurality of switches each coupling between multiple CDS circuits of the plurality of CDS circuits and one of the first output end and the second output end.*

*35. The CMOS image sensor of claim 34, wherein the plurality of switches and the plurality of CDS circuits are on a same single side of the pixel array.*

*36. The CMOS image sensor of claim 34, wherein the plurality of CDS circuits are arranged as a single row.*

*37. The CMOS image sensor of claim 34, wherein the selection circuit further includes at least one divided data bus coupled between the plurality of CDS circuits and the plurality of switches.*

* * * * *